Figure 1:
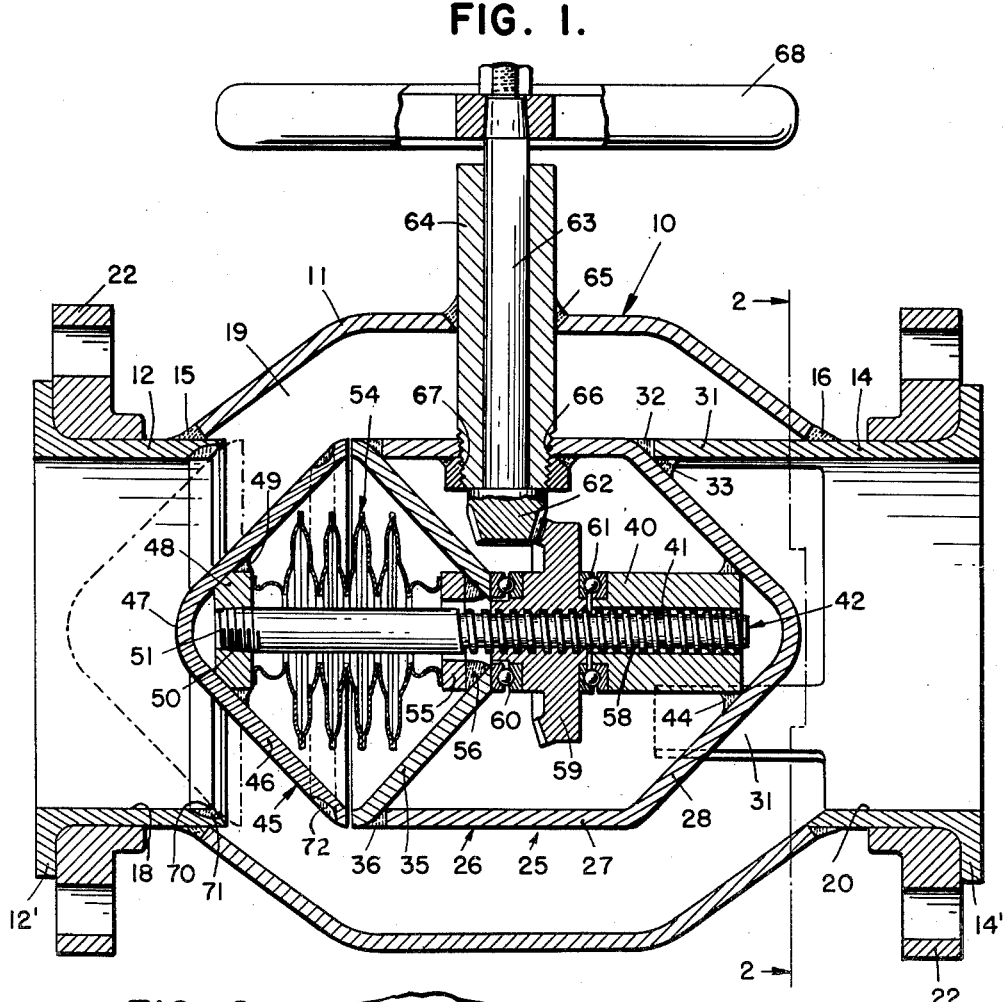

June 23, 1953 W. H. SKEWIS 2,642,890
VALVE
Filed July 2, 1949

INVENTOR
WILLIAM H. SKEWIS
BY
Mason & Graham
ATTORNEYS

Patented June 23, 1953

2,642,890

UNITED STATES PATENT OFFICE 2,642,890

VALVE

William H. Skewis, Los Angeles, Calif.

Application July 2, 1949, Serial No. 102,910

2 Claims. (Cl. 137—219)

1

This invention has to do with valves of the type used for controlling the flow of fluids in pipes and the like.

An object of the invention is to provide a novel relatively lightweight valve of simple construction which can be economically fabricated in standard and custom sizes.

A particular object is to provide a valve construction which makes it possible to use all wrought parts without resorting to any castings. In this connection it is a further object to provide a valve construction in which substantially all joints can be made by welding.

Another object is to provide a valve which, when open, offers a minimum of resistance to the flow of fluid and results in a minimum pressure drop in the line in which it is used. In this connection it is an object to provide a valve of the type wherein the fluid flow through the valve body may be described as substantially a straight-through flow, the valve being provided with a centrally disposed valve member and operating mechanism around which the fluid flows, the valve member and associated mechanism being operated or controlled by a valve stem projecting through the body of the valve to the outside thereof.

A further object is to provide in a valve of the type just described a streamlined construction for the valve member and the centrally disposed valve operating mechanism.

Another object of this invention is to provide a novel construction for supporting the valve member and the associated valve operating mechanism from one end of the valve body in such a way that the supporting structure forms a minimum of resistance of the flow of fluid through the valve.

Another object is to provide a novel flexible valve member which can flex sufficiently to insure the positive seating of the member against the valve seat.

It is also an object to provide a novel valve construction in which no packing is used or required for sealing off the valve stem or any of the parts of the valve. In this connection it is an object to provide a valve in which an actuating valve stem which projects externally of the valve body is used for operating a secondary valve stem located axially of the flow through the valve body in such a manner that neither of the stems is in contact with the fluid which passes through the valve.

Another object is to provide a valve of relatively smooth outer contour which is easy to insulate.

These and other objects will be apparent from the drawing and the following description thereof.

2

Figure 2:
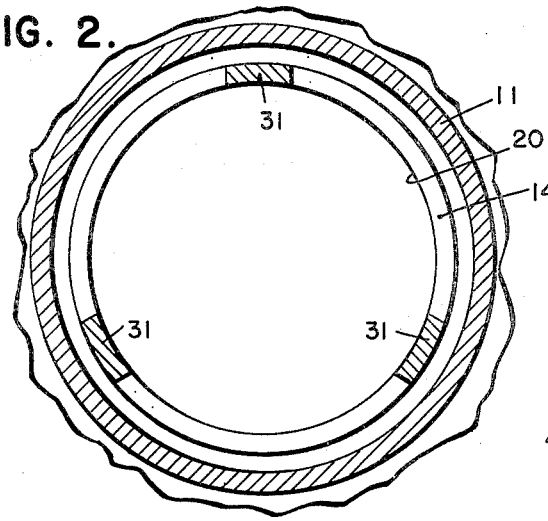

Referring to the drawing, which is for illustrative purposes only:

Fig. 1 is a central longitudinal sectional view through a valve embodying the invention; and Fig. 2 is a cross-sectional view on line 2—2 of Fig. 1.

More particularly describing the invention, numeral 10 generally indicates a valve body or casing which includes a central annular shell 11 and a pair of tubular end sections 12 and 14. These parts are welded together by welds 15 and 16. While it is contemplated that the flow of fluid through the valve may take place in either direction, for the purpose of this description the tubular section 12 will be termed the inlet section and 14, the outlet section. Section 12 defines an inlet port or passage 18 which communicates with a central chamber 19. Beyond this is an outlet port or passage 20.

Tubular sections 12 and 14 are shown as being provided with external flanges 12' and 14', respectively. Bolt-receiving flange rings 22 are shown on the sections 12 and 14. It will be understood that the end sections 12 and 14 of the body may be formed in any desired shape to provide whatever type of connection is desired rather than the flange ring type shown. These parts may also be fabricated in any desired length.

Mounted in the valve body and centrally disposed therein is a valve assembly, generally indicated by numeral 25. This assembly includes a gear housing 26 which has a cylindrical central section 27 and a tapering end section 28 terminating in a rounded end. The gear housing is mounted on three inwardly projecting arms or extensions 31 of the end section 14, being secured thereto by suitable welds 32, 33. The forward end of the gear case may be formed by a substantially frusto-conical wall 35 which is welded at 36 to the central wall 27.

Mounted in the gear housing is a secondary valve stem guide 40 having a smooth bore 41 to receive a secondary valve stem 42. Member 40 is welded in place at 44. The stem 42 carries a valve member 45 which may be described generally as being of outwardly convex form, the major portion thereof being a frusto-conical wall 46 which terminates in a rounded end or nose 47. The valve member may be shaped similarly to the downstream end 28 of the housing 26. The valve member is provided with a stem connection ring 48 which is welded on the inner side of the valve member at 49. This member is provided with a threaded bore 50 to accommodate the threaded end 51 of the secondary valve stem 42.

In order to isolate the secondary valve stem 42, the interior of the gear housing 26, and an actuating or primary stem 63 (later to be described), from the fluid carried by the valve, a bellows 54 is provided between the gear housing 26 and the valve member surrounding the secondary valve stem 42. This bellows is shown as welded or otherwise secured at one end to the stem connection ring 48 (although it may be directly secured to the valve member 45) and at the other end to a bellows mounting ring 55, the latter being secured to the member 35 of the gear housing by a weld 56. The bellows 54 may be of any suitable known construction and in any given installation will be designed to withstand the pressure to which it is contemplated the valve will be subjected.

For actuating the valve member 45, the secondary valve stem 42 is threaded at 58 to receive an interiorly threaded gear 59. Bearings 60 and 61 are provided on opposite sides of the gear, and these in abutting relation to the front wall of the gear housing and the guide 40, respectively. The gear 59 meshes with a pinion 62 formed on or secured to the lower end of a primary valve stem 63 which extends to the exterior of the valve body 11. The stem is surrounded by a stem housing sleeve 64 which is welded at 65 to the valve body and which is threaded at its lower end at 66 where it is threadedly mounted within a threaded bore 67 formed in the gear housing. Any suitable hand wheel 68 may be provided on the outer end of the stem.

It will be apparent from the above description that rotation of the primary valve stem 63 will operate the secondary valve stem 42 causing axial movement thereof whereby the valve member 45 may be moved from the open position in which it is shown to the closed position shown in broken lines, Fig. 1. In the closed position the valve member contacts an annular seat 70 formed on the inner end of the tubular section 12.

The valve seat may be formed of any desired material and an insert 71 of any desired material may be provided thereon. A similar insert or facing 72 may be provided on the valve member 45.

It will be apparent that the valve member 45, by reason of its shape and the fact that it is supported near its center, is inherently flexible in the region where it is adapted to contact the valve seat 70 and will thereby accommodate itself to any irregularities in or on the seat to insure positive closure of the valve.

When the valve member is in the open position, the edges of the valve member 45 are closely adjacent the forward edges of the gear housing 26 so that the valve member 45 in this position complements the rear or downstream end of the gear housing whereby the entire valve assembly 25 presents a streamlined surface to the flow of fluid through the valve. In this connection the fact that the gear housing is supported upon inwardly extending sections of the outlet tubular end section 14 results in minimum interference to the flow of fluid through the valve as a whole.

It will also be apparent that the valve may be readily fabricated economically. Many parts of the valve may be made from standard tubes or pipes formed to the desired shapes. In assembling the valve, the entire inner valve assembly 25 is mounted on the outlet end section 14 after which the valve assembly 25 is inserted in the remainder of the body (parts 11 and 12 which have previously been welded together) and the part 14 secured to part 11 by welding at 16. Stem 63 and stem housing 64 are then inserted and the weld 65 made to complete the assembly.

It is contemplated that, if desired, the valve may be operated by fluid pressure in place of the gear mechanism shown. In order to accomplish this, it is only necessary to remove the gear wheel 59, the two bearings 60 and 61, and the stem 63 with pinion 62 thereon. Fluid for operating the valve may then be introduced through the sleeve 64 from any suitable source. If desired, the bellows may be made larger in order to increase the effective cross-sectional area thereof for operating the valve.

Although the invention has been particularly shown and described, it is contemplated that various changes and modifications can be made without departing from the scope thereof as set forth in the claims.

I claim:

1. A valve, comprising a tubular wrought valve body including a central annular shell and a pair of tubular end sections of less diameter welded thereto one at each end of the shell, one of said end sections having circumferentially spaced arms projecting into said shell, a gear housing carried by said arms and having a diameter no greater than said one end section, a threaded valve stem mounted for axial movement in said gear housing and projecting axially therefrom away from said end section with said arms, a conoidal valve element mounted on said stem, a valve seat formed on the inner end portion of the other of said end sections, a longitudinally flexible bellows surrounding the projecting portion of said stem and secured at its ends to said valve element and gear housing respectively, a valve stem operating shaft extending from exteriorly of said valve body to the interior of said gear housing, a sleeve secured to said valve body and to said gear housing rotatively receiving said shaft, and interengaging gear means on said shaft and said valve stem for moving said stem axially in response to rotation of said shaft.

2. A valve as defined in claim 1 in which said valve element is plate-like in character and is supported only in the region of its center and is so proportioned as to engage said seat near the periphery of the valve element whereby to impart flexibility to the valve element enabling it to compensate for misalignment of the seat and valve element.

WILLIAM H. SKEWIS.

References Cited in the file of this patent

UNITED STATES PATENTS

| Number | Name | Date |
|---|---|---|
| 1,055,958 | White | Mar. 11, 1913 |
| 1,441,784 | Clayton | Jan. 9, 1923 |
| 1,958,379 | Yeager | May 8, 1934 |
| 2,297,082 | Staats | Sept. 29, 1942 |
| 2,357,527 | Lundquist | Sept. 5, 1944 |
| 2,373,268 | Shelly | Apr. 10, 1945 |
| 2,442,625 | Thomas | June 1, 1948 |

FOREIGN PATENTS

| Number | Country | Date |
|---|---|---|
| 161,284 | Great Britain | of 1921 |
| 359,578 | Italy | of 1938 |
| 446,096 | Germany | of 1927 |